US008480964B2

(12) United States Patent
Awadh

(10) Patent No.: US 8,480,964 B2
(45) Date of Patent: Jul. 9, 2013

(54) PLATE REACTOR

(75) Inventor: Tawfik Abdo Saleh Awadh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 61 days.

(21) Appl. No.: 13/176,700

(22) Filed: Jul. 5, 2011

(65) Prior Publication Data

US 2013/0011309 A1 Jan. 10, 2013

(51) Int. Cl.
| *B01J 8/08* | (2006.01) |
| *B01J 8/00* | (2006.01) |
| *B01J 8/02* | (2006.01) |
| *B01J 35/02* | (2006.01) |
| *B01J 19/00* | (2006.01) |
| *C02F 1/00* | (2006.01) |
| *C02F 1/02* | (2006.01) |
| *C02F 1/32* | (2006.01) |
| *C02F 1/34* | (2006.01) |

(52) U.S. Cl.
USPC ........... 422/209; 422/129; 422/187; 422/211; 210/600; 210/748.01; 210/748.1; 210/748.13

(58) Field of Classification Search
USPC .................. 422/129, 187, 209, 211; 210/600, 210/748.01, 748.1, 748.13, 748.14
See application file for complete search history.

(56) References Cited

U.S. PATENT DOCUMENTS

| 3,211,148 A | 10/1965 | Galajda, Jr. |
| 5,229,100 A | 7/1993 | Harpole |
| 6,613,225 B1 * | 9/2003 | Toyoda et al. ................ 210/205 |
| 7,041,620 B2 * | 5/2006 | Smalley et al. ............... 502/182 |
| 7,244,408 B2 * | 7/2007 | Ryzhkov .................... 423/447.2 |
| 7,541,509 B2 * | 6/2009 | Sigmund et al. .............. 588/299 |
| 2005/0130839 A1 * | 6/2005 | Cheng et al. .................. 502/439 |
| 2007/0144942 A1 | 6/2007 | Tiitta et al. |
| 2008/0251971 A1 | 10/2008 | Kim et al. |
| 2010/0040869 A1 | 2/2010 | Kuo et al. |
| 2010/0294350 A1 | 11/2010 | Ko et al. |

FOREIGN PATENT DOCUMENTS

| JP | 11319857 A * 11/1999 |
| WO | WO 2005051535 A1 6/2005 |
| WO | WO 2008021602 A2 2/2008 |

OTHER PUBLICATIONS

Machine translation of JP 11-319857 A, which was published on Nov. 24, 1999.*
Wang et al., Preparation, characterization and photocatalytic activity of multi-walled carbon nanotube-supported trioxide composites, 2008, Journal of Physics and Chemistry of Solids, 69, 2396-2400.*

* cited by examiner

*Primary Examiner* — Jill Warden
*Assistant Examiner* — Natasha Young
(74) *Attorney, Agent, or Firm* — Richard C. Litman

(57) ABSTRACT

The plate reactor includes a rotatable plate coated with a thin film containing an active photocatalytic nanocomposite. In use, the plate is partially submerged in polluted water so that a portion thereof is exposed to air and light. The exposed areas of the plate gains oxygen from the air, which reacts with the photo-promoted electrons from the coating. This results in the formation of very reactive superoxide radical ions ($O_2^-$) and/or the generation of hydroxyl radicals (.OH), either of which can oxidize targeted organic matter and pollutants in wastewater when the exposed area is submerged during rotation of the plate, thus purifying the water. A plurality of paddles radially extend from the edge of the plate to mix the water during rotation.

10 Claims, 4 Drawing Sheets

PLATE REACTOR

BACKGROUND OF THE INVENTION

1. Field of the Invention

The present invention relates to water treatment devices, and particularly to a plate reactor that is used to remove organic materials from water using a photocatalytic nanocomposite material embedded in a thin film coating on the surface of the plate for enhanced degradation of the organic materials and pollutants when the photocatalytic material is exposed to visible or natural light.

2. Description of the Related Art

The demand for fresh water is rapidly approaching the available supply of drinking water. Also, huge quantities of water are needed for various industrial operations. Arid regions or areas far from a ready source are especially affected because they suffer from their ability, finances and resources to meet these demands. To counteract this issue, inroads into purification of wastewater have been made. One solution for purifying wastewater involves the use of photo-degradation of organic matter, such as high molecular weight oil contaminants in industrial wastewater. Some reactor systems are known that use a conductive solid electrolyte in a photoelectric reactor, or that use a photocatalytic reactor using a titanium dioxide catalyst exposed to ultraviolet (UV) radiation. However, most such systems utilize catalysts having low activity or entail high economic cost.

Another solution for water treatment involves the use of harsh chemicals. The chemicals perform effectively to clean the water, but they pose potential hazards that have a negative impact on the environment. Moreover, the costs for obtaining, making and using such products may not be economically feasible for everyone.

In light of the above, it would be a benefit in the art of water treatment devices to provide an environmentally friendly and efficient means of removing organic contaminants and pollutants from wastewater. Thus, a plate reactor solving the aforementioned problems is desired.

SUMMARY OF THE INVENTION

The plate reactor includes a rotatable plate coated with a thin film containing an active photocatalytic nanocomposite. In use, the plate is partially submerged in polluted water so that a portion thereof is exposed to air and light. The exposed areas of the plate gains oxygen from the air, which reacts with the photo-promoted electrons from the coating. This results in the formation of very reactive superoxide radical ions ($O_2^-$) and/or the generation of hydroxyl radicals (.OH), either of which can oxidize targeted organic matter and pollutants in wastewater when the exposed area is submerged during rotation of the plate, thus purifying the water. A plurality of paddles radially extend from the edge of the plate to mix the water during rotation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
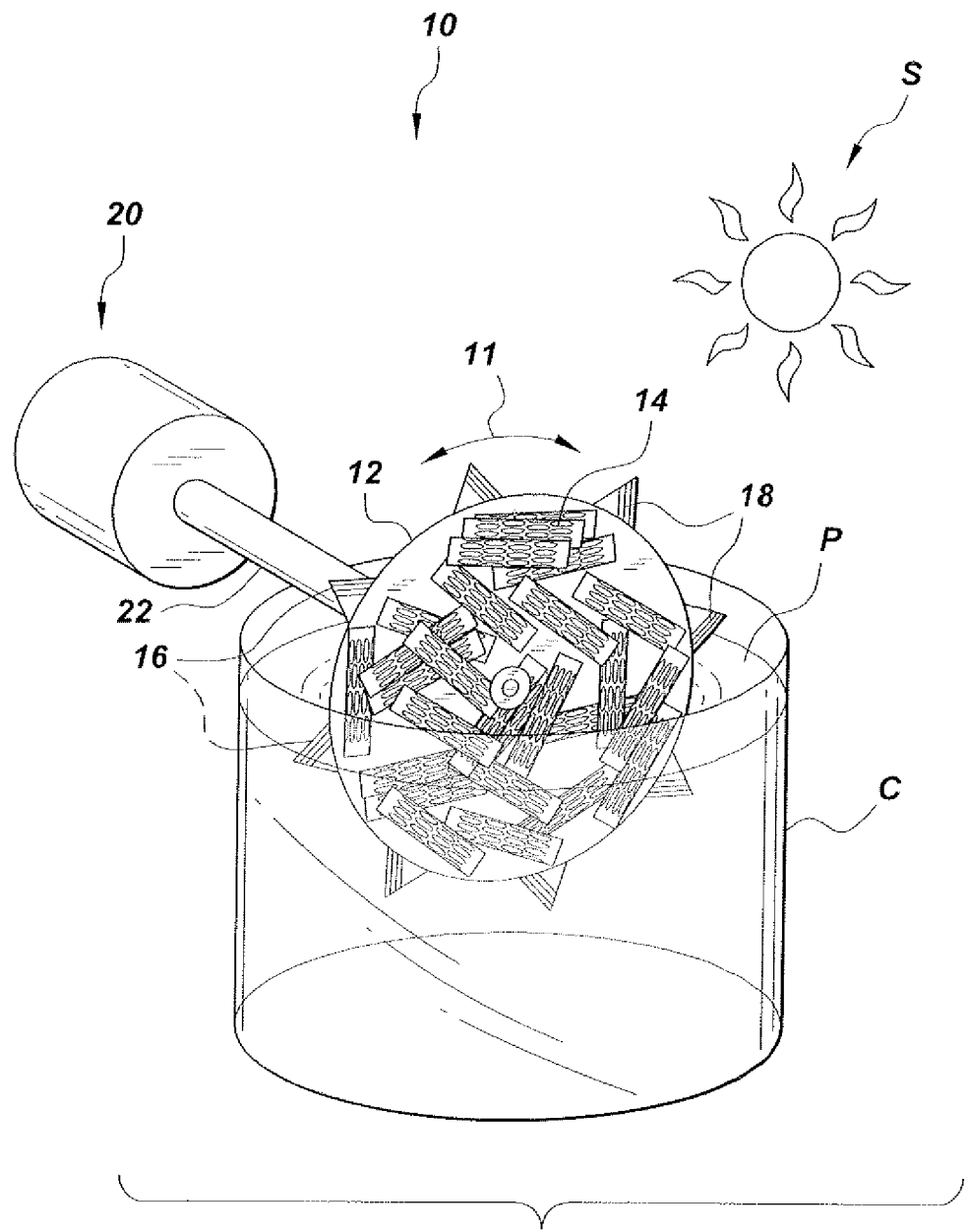
FIG. 1 is a diagrammatic environmental, perspective view of a plate reactor according to the present invention.
Figure 2:
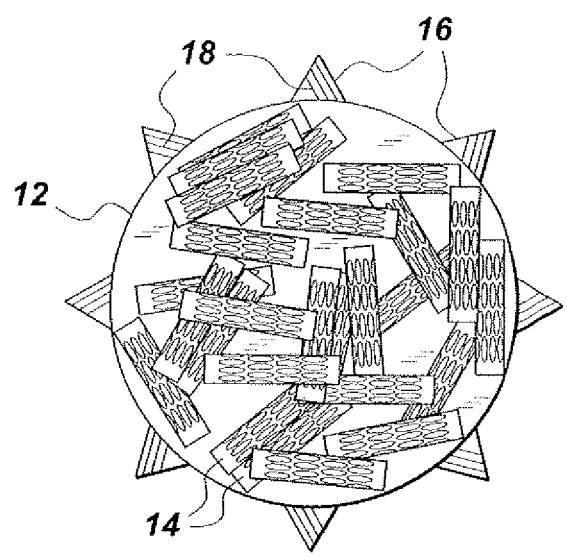
FIG. 2 is a diagrammatic front view of the rotatable plate shown in FIG. 1.

A first embodiment of the plate reactor, generally referred to in FIG. 1 by the reference number 10, utilizes a coated plate to treat polluted water or solution P. As shown in FIGS. 1 and 2, the plate reactor 10 includes a rotatable plate or support 12 coated with a catalytic active nanocomposite 14. The nanocomposite coating 14 is highly reactive or catalytic when exposed to light, and further details thereof will be described below. The plate 12 may be made from ceramic, glass or polymer, and may have any desired thickness and dimensions. The plate 12 may be a disc having a plurality of radially extending projections or paddles 16 disposed at spaced intervals around the edge of the plate 12. The paddles 16 are adapted to stir, agitate or mix the solution P. This action enhances the catalytic reaction between the nanocomposite coating 14 and the solution P. Each paddle 16 may include a plurality of grooves 18 for more thorough mixing of the solution P and thereby further increase the reaction rate. As an alternative, the grooves 18 may be disposed on selected paddles 16.

In use, the exemplary plate reactor 10 may be attached to a motor 20 by a drive shaft 22 for positive rotation of the plate 12 in the direction indicated by arrow 11. This disposition of the plate reactor 10 results in at least half of the plate 12 being submerged in the solution P contained in a container C. The other half or remainder of the plate 12 is exposed to air and a light source, such as light from the sun S, visible or natural light, or ultraviolet (UV)-radiation. The exposed area of the plate 12 gains oxygen from the air, which reacts with the photo-promoted electrons from the coating 14. This results in formation of very reactive superoxide radical ions ($O_2^-$) that can oxidize and/or generate hydroxyl radicals (.OH) that oxidize the targeted organic matter and pollutants in the solution P when the exposed area submerges during rotation of the plate 12. This reaction degrades the pollutants in the solution P, purifying the water. As the plate 12 rotates, other areas of the plate 12 are exposed to air; thus exposing all areas of the plate 12 as the plate 12 rotates. The rate of rotation can be constant or at predetermined intervals. The plate reactor 10 may be used alone or inline in a water purifying plant or system.

Figure 3:
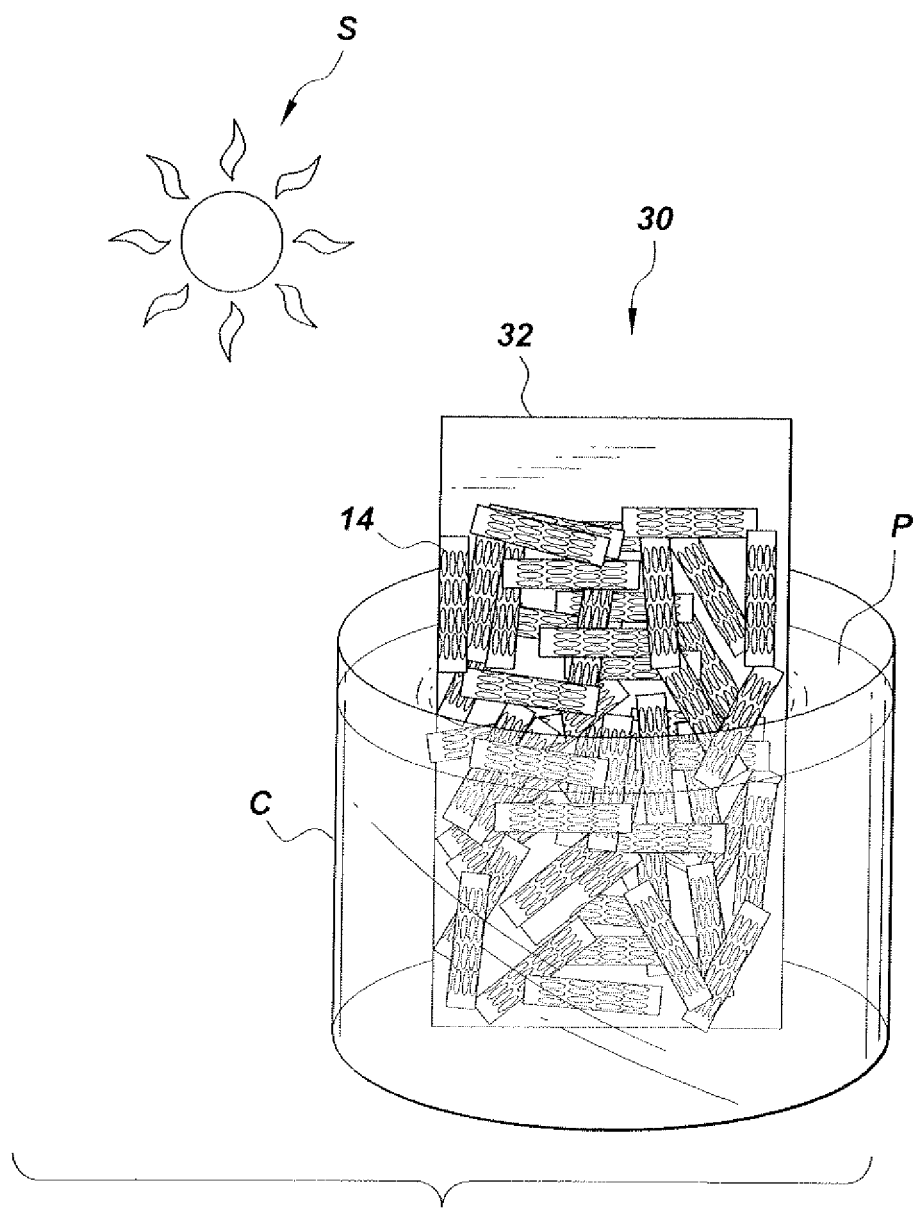
FIG. 3 is an environmental perspective view of an alternative embodiment of a plate reactor according to the present invention.

FIG. 3 discloses an alternative embodiment of the plate reactor, designated as 30 in the drawing. In this embodiment, the plate reactor 30 includes a plate or support 32 coated with the catalytic active nanocomposite 14. The plate 32 may be a substantially flat, rectangular sheet. In use, the plate 32 is partially submerged in the solution P in the same manner as described above with respect to the plate 12 to promote the catalytic process. However, the plate 32 may be manually rotated or positively rotated by a motor (not shown in FIG. 3). Although a disc-shaped plate 12 and a rectangular plate 32 are shown in the drawings, it will be understood that the plate may have any desired shape, and may be irregular in shape.

Figure 4:
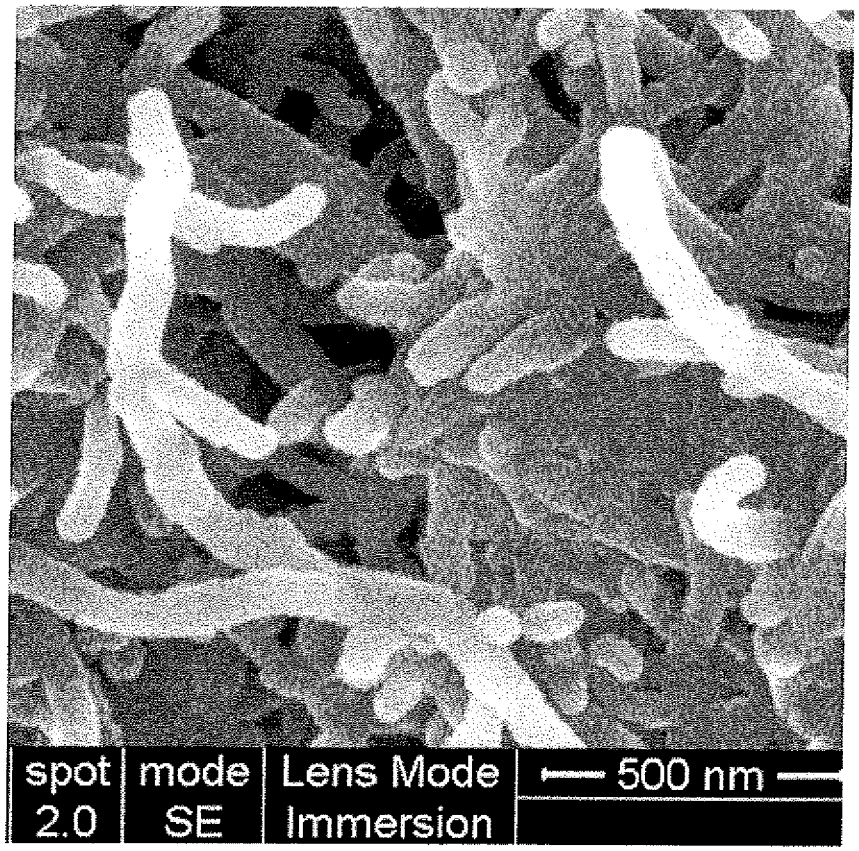
FIG. 4 is a scanning electron micrograph of the nanocomposite of carbon nanotubes functionalized with tungsten oxide nanoparticles.

The thin film coating may be prepared by activating the carbon nanotubes through refluxing with an oxidizing agent, such as nitric acid, mixtures of sulfuric acid and nitric acid, potassium permanganate, hydrogen peroxide, etc., in order to form carbonyl or carboxyl groups on the surface of the nanotubes, which provide binding sites for the nanoparticles. The carbon nanotubes may be single-walled, double-walled, or multi-walled. The carbon nanotubes may have an average length between about 100 nm and about 2000 nm, and an average diameter between about 0.1 nm and about 15 nm. The metal or metal oxide nanoparticles may be bonded to the nanotubes by any conventional technique, e.g., by wet chemistry methods, by sol-gel method, by hydrolysis, etc. The nanoparticles preferably have a diameter between 4 nm and 100 nm. In a preferred embodiment, the metal oxide particles are tungsten oxide ($WO_3$), which are mixed with the nanotubes in a preferred ratio of 70% carbon nanotubes to 30% tungsten oxide nanoparticles by weight. FIG. 4 shows a SEM micrograph of an exemplary sample of carbon nanotubes functionalized with tungsten oxide nanoparticles.

In a preferred embodiment, the metal oxide nanoparticles are bonded to the carbon nanotubes by sol-gel method to form the nanocomposite coating. The coating may be applied to the plate 12 or 32 by spin coating or deep coating. The plate 12 or 32 is then calcined between 250° C. and 400° C., and allowed to cool to room temperature, forming a thin film coating having a thickness between 0.1 nm and 5 mm. The nanocomposite coating can then be characterized by X-ray diffraction, field emission scanning electron microscopy, high resolution transmission electron microscopy, Fourier transform infrared absorption spectroscopy, X-ray photoelectron spectroscopy, etc., as desired. It will be understood that the nanocomposite coating may be applied to one or both sides of the plate 12, 32, as desired.

It is to be understood that the present invention is not limited to the embodiments described above, but encompasses any and all embodiments within the scope of the following claims.

I claim:

1. A plate reactor, comprising:
   a rotatable plate having a surface;
   a photocatalytic coating bonded to the surface of the plate, the coating catalyzing degradation of organic matter and pollutants in wastewater to harmless matter, wherein said photocatalytic coating comprises a nanocomposite material, the nanocomposite material comprising tungsten oxide nanoparticles bonded to carbon nanotubes, wherein said photocatalytic coating has a carbon nanotube to tungsten oxide nanoparticle weight ratio of about 70% carbon nanotubes to about 30% tungsten oxide nanoparticles; and
   means for rotating the plate so that a portion of the plate is submerged in the wastewater and a portion is exposed to light and air, the portions being alternately submerged and exposed.

2. The plate reactor according to claim 1, wherein said rotatable plate is a disc, the disc having an outer edge.

3. The plate reactor according to claim 2, wherein said disc further comprises a plurality of paddles extending from the edge of the disc, the paddles promoting mixing of the wastewater as the plate rotates.

4. The plate reactor according to claim 3, wherein at least one of said paddles has a plurality of grooves formed thereon, the grooves promoting thorough mixing of the wastewater as the plate rotates.

5. The plate reactor according to claim 1, wherein said nanoparticles have a diameter between about 4 nm and 100 nm.

6. The plate reactor according to claim 1, wherein said carbon nanotubes have an average length between about 100 nm and about 2000 nm.

7. The plate reactor according to claim 1, wherein said carbon nanotubes have an average diameter between about 0.1 nm and about 15 nm.

8. The plate reactor according to claim 1, wherein the metal oxide nanoparticles of the photocatalytic coating are bonded to the carbon nanotubes by sol-gel method, wherein the coating is applied to the plate by spin coating or deep coating.

9. The plate reactor according to claim 1, wherein said photocatalytic coating has a thickness between 0.1 nm and 5 mm.

10. The plate reactor according to claim 1, wherein said rotatable plate is made from a material selected from the group consisting of ceramic, glass, and polymer.

* * * * *